United States Patent
Richardson et al.

(10) Patent No.: US 8,548,129 B2
(45) Date of Patent: *Oct. 1, 2013

(54) SYSTEM AND METHOD FOR ENHANCED MESSAGE NOTIFICATION

(75) Inventors: Simon James Richardson, Pflugerville, TX (US); Mark Steven Wuthnow, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 281 days.

This patent is subject to a terminal disclaimer.

(21) Appl. No.: 13/101,381

(22) Filed: May 5, 2011

(65) Prior Publication Data
US 2011/0207437 A1 Aug. 25, 2011

Related U.S. Application Data

(63) Continuation of application No. 11/762,277, filed on Jun. 13, 2007, now Pat. No. 7,953,395, which is a continuation of application No. 10/938,350, filed on Sep. 10, 2004, now Pat. No. 7,248,857, which is a continuation-in-part of application No. 10/789,616, filed on Feb. 27, 2004, now Pat. No. 7,277,529.

(51) Int. Cl.
*H04M 1/64* (2006.01)

(52) U.S. Cl.
USPC ................ 379/88.12; 379/88.14; 379/88.22; 455/412.2; 455/413; 455/414.4; 455/421; 455/422.1

(58) Field of Classification Search
USPC ..... 370/259–271, 351–357; 379/67.1–88.28, 379/201.01; 455/412.1–426.2, 550.1–560, 455/575.1–575.9, 90.1–90.3; 704/270–278; 709/201–207, 217–248; 348/14.01–14.16
See application file for complete search history.

(56) References Cited

U.S. PATENT DOCUMENTS

| | | | |
|---|---|---|---|
| 5,029,199 A | 7/1991 | Jones et al. | |
| 5,193,110 A | 3/1993 | Jones et al. | |
| 5,572,583 A | 11/1996 | Wheeler et al. | |
| 5,742,668 A | 4/1998 | Pepe et al. | |
| 5,838,768 A | 11/1998 | Sumar et al. | |
| 5,856,825 A | 1/1999 | Yumoto et al. | |

(Continued)

OTHER PUBLICATIONS

Nokia, "Are you ready for Multimedia Messaging Service: An evolutionary approach to implementing MMS", white paper 2002.

(Continued)

*Primary Examiner* — Hemant Patel
(74) *Attorney, Agent, or Firm* — Parks IP Law LLC; Mickki D. Murray, Esq.

(57) ABSTRACT

Enhanced message notification is provided by an enhanced notification function element and a subscriber preference profile database. The enhanced notification function element queries the subscriber preference profile database to obtain subscriber communication terminal capabilities information, which it uses to select a message notification technology. The enhanced notification function element may then format an enhanced notification that is delivered to a communication terminal through a delivery system architecture appropriate for the selected message notification technology. The enhanced notification may contain: a message type indicator; an identifier of the party leaving the message; a date and time that the message was deposited; multimedia objects; and other enhanced information. The enhanced notification function element may also query a terminal roaming status database in order to determine if the enhanced message should be sent when the terminal is roaming. The enhanced notification function element ma also provide content adaptation for the enhanced notification.

20 Claims, 13 Drawing Sheets

(56) References Cited

U.S. PATENT DOCUMENTS

| | | | |
|---|---|---|---|
| 6,085,068 A | 7/2000 | Eaton et al. | |
| 6,480,712 B1 | 11/2002 | Vigil | |
| 6,560,318 B1 | 5/2003 | Spielman et al. | |
| 6,628,761 B1 | 9/2003 | Adamczyk et al. | |
| 6,640,097 B2 | 10/2003 | Corrigan et al. | |
| 6,668,049 B1 | 12/2003 | Koch et al. | |
| 6,693,652 B1 | 2/2004 | Barrus et al. | |
| 6,714,859 B2 | 3/2004 | Jones | |
| 6,731,942 B1 | 5/2004 | Nageli | |
| 6,807,259 B1 | 10/2004 | Patel et al. | |
| 6,832,243 B1 | 12/2004 | Mikalsen et al. | |
| 7,020,460 B1 * | 3/2006 | Sherman et al. | 455/415 |
| 7,283,808 B2 * | 10/2007 | Castell et al. | 455/413 |
| 7,953,395 B1 * | 5/2011 | Richardson et al. | 455/413 |
| 2001/0034226 A1 | 10/2001 | Watanabe et al. | |
| 2002/0160756 A1 | 10/2002 | Amin | |
| 2003/0068019 A1 | 4/2003 | Coleman | |
| 2003/0126263 A1 | 7/2003 | Fenton et al. | |
| 2003/0228863 A1 | 12/2003 | Vander Veen et al. | |
| 2003/0233580 A1 | 12/2003 | Keeler et al. | |
| 2004/0023643 A1 | 2/2004 | Vander Veen et al. | |
| 2004/0085360 A1 | 5/2004 | Pratt et al. | |
| 2004/0121762 A1 * | 6/2004 | Chou et al. | 455/413 |

OTHER PUBLICATIONS

Openwave—Multimedia Messaging Service Center, www.openwave.com/us/products/mobile/operator_products.

Motorola—Motorola Multimedia Messaging Service, www.motorola.com/networkoperations/pdfs/VAS_MMSC.pdf.

Tenet Technologies—Unified Multimedia Messaging Service (UMMS) Server, www.tenetmedia.com.

Openwave—Operator Products, www.openwave.com/us/products/mobile/operator_products/.

Openwave—Openwave Voice Messaging, www.openwave.com/us/products/mobile/operator-products/.

* cited by examiner

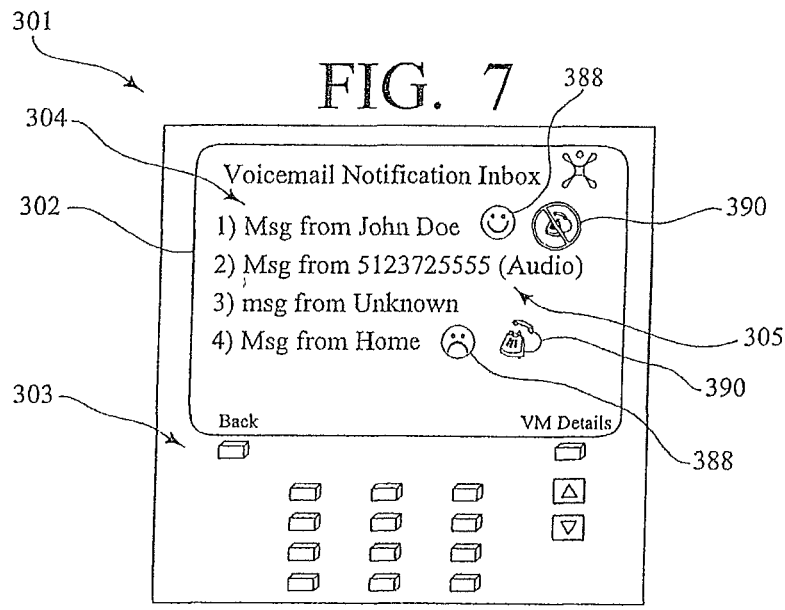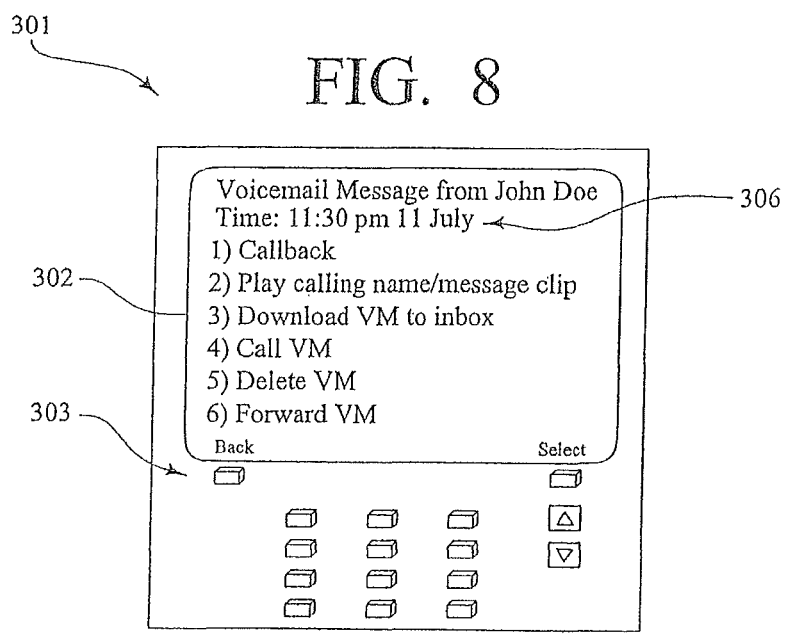

SYSTEM AND METHOD FOR ENHANCED MESSAGE NOTIFICATION

CROSS-REFERENCE TO RELATED APPLICATIONS

This application is a continuation of U.S. application Ser. No. 11/762,277, filed Jun. 13, 2007, now U.S. Pat. No. 7,953,395 which is a continuation of U.S. application Ser. No. 10/938,350, filed Sep. 10, 2004 (now U.S. Pat. No. 7,248,857), which is a continuation-in-part of U.S. application Ser. No. 10/789,616, filed Feb. 27, 2004 (now U.S. Pat. No. 7,277,529), the entireties of which are herein incorporated by reference.

BACKGROUND OF THE INVENTION

A. Field of Invention

This invention relates to a system and method for enhanced message notification. More particularly, the invention relates to a system and method for providing message notification in an environment having multiple message notification technologies.

B. Description of Related Art

Voice mail is an extremely useful business and personal tool that allows callers to leave voice message when the called party is not available to take an incoming call directly. As such, voice mail has been implemented by many telephone carriers, both wireline and wireless, as an additional benefit for their subscribers.

In a typical application, a call to a subscriber is routed to the subscriber's home switch. If the subscriber's communication terminal is not available or if the subscriber does not respond to a call page over the communication network, the switch forwards the call and information regarding the subscriber, including the subscriber's phone number, to a Voice Mail System (VMS). The VMS then records a message from the caller and stores the message in a "mailbox" associated with the subscriber's identifier (e.g. phone number) for later retrieval by the subscriber.

Currently, when there is a new voice message in the mailbox, the VMS will generate a limited notification and alert the subscriber communication terminal to the presence of the new voice message. Upon receiving the notification, the subscriber can call in to the VMS to access their voice message, and listen to the message. This serving mechanism requires the subscriber to call into the VMS, authenticate themselves with their mailbox number and password, and interact with the VMS through multiple steps before being able to listen to their message and determine the identity of the caller and the importance of the message. Navigating through multiple new and saved message can be tedious, as the messages must generally be reviewed in the order that they were received, potentially causing the subscriber to listen to multiple messages before reaching the desired message.

Additionally, other types of messages, such as e-mail, fax and other multimedia messages, have similar issues with identifying the party that left the message, determining the importance of the message, and navigating through the messages.

Thus, there is a need for a system and method for providing message notification, where the notification is enhanced with an identifier of the party that left the message or the importance of the message. Additionally, there is a need for an improved interface to such messages that utilizes such enhanced notifications to simplify navigation through multiple messages.

Recently, the introduction of Java Wireless Messaging API supporting Short Message Service (SMS) and Multimedia Messaging Service (MMS), and efficient transport networks such as General Packet Radio Service (GPRS) and Enhanced Data rate for Global Evolution (EDGE) have provided enhanced notification and messaging capabilities. However, these developments have also created an environment where multiple notification and messaging technologies are in use. Subscriber terminals have diverse capabilities with respect to such technologies. For instance, some terminals may not be capable of receiving MMS or SMS format messages, Further, some terminals capable of receiving MMS format messages may support only selected multimedia formats (e.g. .WAV but not MPEG4). Thus, it has been difficult for communication carriers to provide a single-carrier branded message notification client across all communication terminal vendors.

Therefore, there is a further need for a system and method for providing enhanced message notification in an environment having multiple messaging and notification technologies, and in an environment having subscriber communication terminals with diverse messaging and notification technology and file format capabilities.

SUMMARY OF THE INVENTION

The system and method of the present invention solves these needs, and others, by providing enhanced message notification in an environment having multiple message notification technologies.

Among the advantages, the invention provides richer message notification to the subscriber with an improved message system user interface. Additionally, the invention offers improved visibility and navigation of messages, and allows a single, service provider branded message notification client across all communication terminal brands and messaging capabilities.

Generally described, an enhanced notification function element receives a basic notification request containing an identifier of the subscriber to whom the basic notification request is directed. The enhanced notification function element then queries a subscriber preference profile database to obtain subscriber communication terminal capabilities information. The enhanced notification function element can then select a message notification technology for delivery of an enhanced notification to the subscriber terminal using the subscriber terminal capabilities information.

For example, if the subscriber terminal capabilities information indicates that the subscriber terminal is not capable of receiving enhanced messages, or does not have an enhanced message notification client application program, the enhanced notification function element will select a traditional message notification technology. However, if the capabilities information indicates that the subscriber terminal is capable of receiving enhanced messages and has an enhanced message notification client application program, then the enhanced notification function element may select an enhanced notification technology.

In accordance with other aspects of the invention, the enhanced notification function element formats or assembles an enhanced notification with: a message type indicator; an identifier of the party leaving the message; the date and time that the message was deposited; or a multimedia object. Multimedia objects could include: an audio clip of the name of the party leaving the message; a photograph; a mood icon; or a presence and availability indicator associated with the party leaving the message. If the enhanced notification function element has access to a Line Information Database (LIDB)

and if the identifier of the party leaving the message is a telephone number, the enhanced notification function element may also include the name of the party leaving the message with the enhanced notification.

Still further, according to another aspect of the invention, the subscriber terminal capabilities information includes content format requirements for the subscriber terminal. Thus, the enhanced notification function element can adapt the content of the enhanced notification to comply with the content format requirements of the subscriber terminal.

In accordance with event further aspects of the invention, the delivery of the enhanced notification to the subscriber communication terminal is accomplished over a communication network using a delivery system architecture that is appropriate for the selected message notification technology. Exemplary delivery system architectures include: traditional message notification; SMS based message notification; and MMS based message notification.

If the communication terminal is a wireless terminal, the enhanced notification function element might access a terminal roaming status database to determine if the terminal is roaming and, if so, whether the roaming service provider is an acceptable partner for the delivery of enhanced message notifications. If the roaming service provider is not an acceptable partner, for cost or other reasons, the enhanced notification function element can select a traditional message notification technology or refrain from sending a notification.

Advantageously, the system can be integrated with an advanced system for providing voice mail service in an environment having multiple voice mail technology platforms, such as traditional network based voice mail systems and newer multimedia systems capable of delivering voice mail messages directly to the communication terminal. Such a system could utilize an automatic message attendant device which obtains voice mail technology platform indicator information from subscriber information databases to select a voice mail technology platform. The automatic message attendant device may also provide recorded messages directly to the enhanced notification function element. Therefore, according to the further aspect of the invention, the enhanced notification function element enhances the notification with at least a portion of a recorded voice mail message.

Still further, the enhanced notification function element could receive basic notification requests from multiple message systems where a subscriber might receive messages. In this case, the enhanced notification function element might also enhance the notification with information regarding the subscriber phone number to which the message was directed.

Thus, the invention provides a system and method for providing enhanced message notification in an environment having multiple message notification technologies.

The invention is not limited to the preceding description and will be better understood by reference to the following detailed description and the appended drawings and claims.

BRIEF DESCRIPTION OF THE DRAWINGS

FIG. 7 is a front view of an exemplary communication terminal displaying a graphical representation of a message mailbox such as might be provided according to the invention.

FIG. 8 is another view of the communication terminal of FIG. 7, showing a graphical user interface for management of messages.

DETAILED DESCRIPTION OF EXEMPLARY EMBODIMENTS

Figure 1:
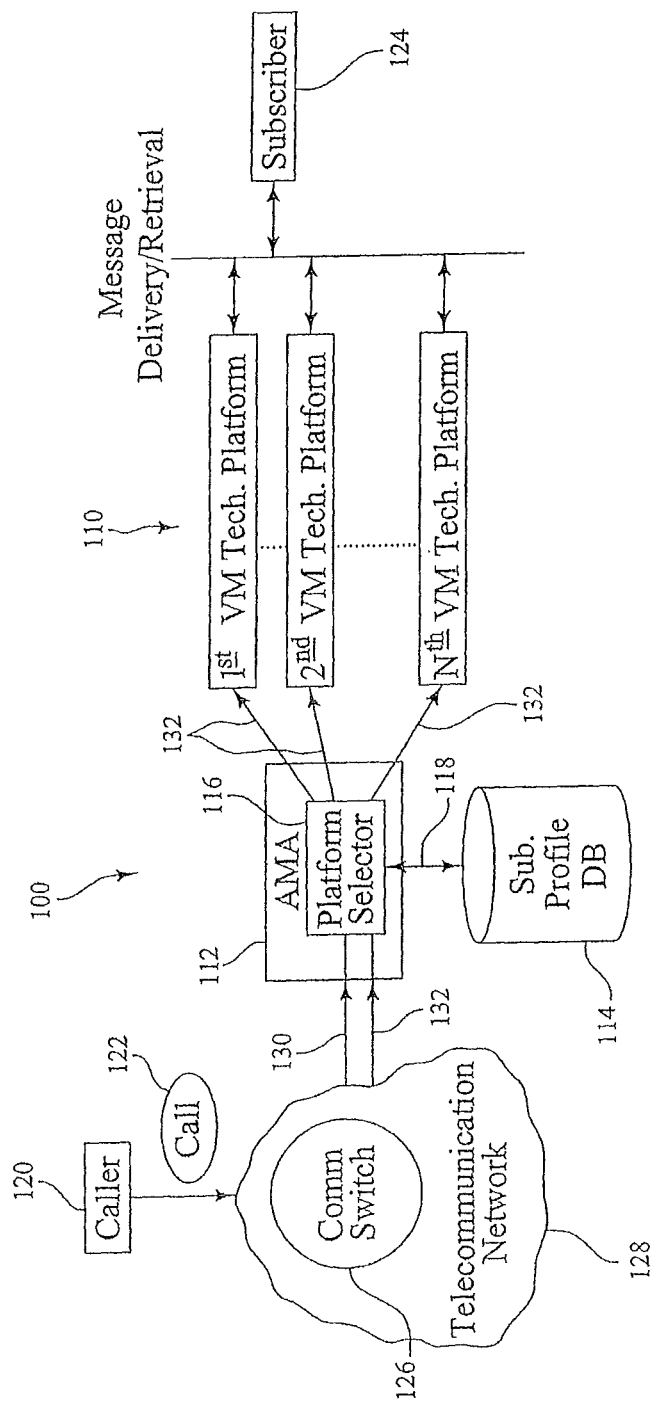
FIG. 1 is a functional block diagram of an exemplary system for voice mail service in an environment having multiple voice mail technology platforms.

A. Voice Mail Service in an Environment Having Multiple Voice Mail Technology Platforms As shown in FIG. 1, an exemplary system 100 for providing voice mail service in an environment having multiple voice mail technology platforms 110 includes an Automatic Message Attendant (AMA) device 112 and a subscriber profile database 114. The AMA device 112 has a platform selector element 116. The platform selector element 116 is in communication with the subscriber profile database 114 via an appropriate data link 118, such as a Lightweight Directory Access Protocol (LDAP) link or an internal bus connection in the event that the database 114 is integrated with the platform selector element 116. The subscriber profile database 114 is provisioned with voice mail technology platform indicator information for subscribers.

In operation, a caller 120 places a call 122 to a subscriber 124. The call 122, or information about the call, reaches a communication switch 126 through a telecommunication network 128 for connection of the caller 120 to the subscriber 124. However, upon a triggering event which indicates that the caller 120 should be connected to a voice mail system, the communication switch 126 will deliver information about the call to the AMA device 112, or, more particularly, to the platform selector element 116. The call information delivery is accomplished through an appropriate signaling means 130, such as in-band signaling over the call circuit or out-of-band signaling, such as over a common signaling network (i.e., in SS7 network or the equivalent). The call information includes an identity (e.g. phone number) of the subscriber to whom the call was placed. The platform selector element 116 then obtains profile information to the subscriber 124 from the subscriber profile database 114. The profile information includes the voice mail technology platform indicator information for the subscriber 124. The platform selector element 116 then selects a voice mail system platform 110 by using the voice mail technology platform indicator information. The call 122 and the subscriber identity can then be delivered by an appropriate delivery system architecture 132 to the appropriate voice mail technology platform for providing voice mail service for the subscriber 124.

Figure 2:
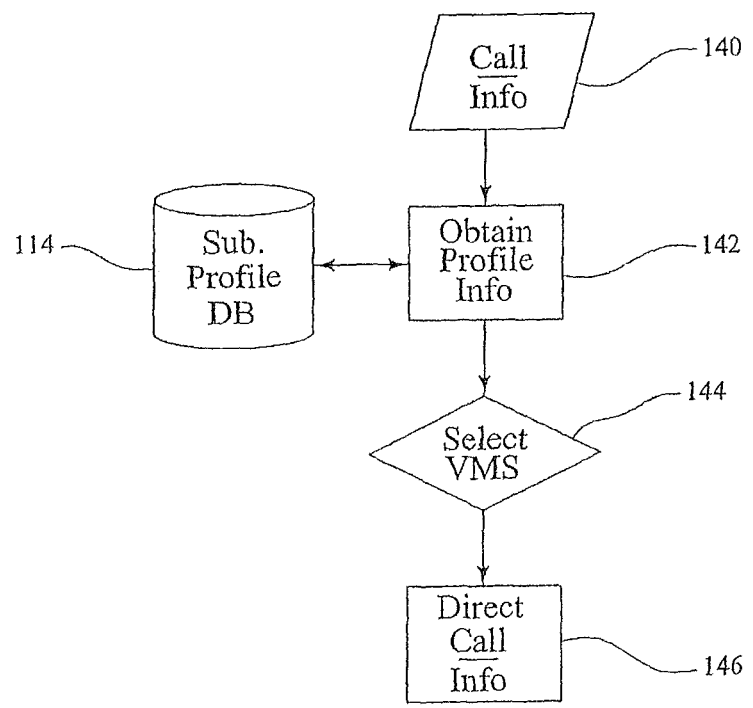
FIG. 2 is a logic flow diagram of an exemplary method for voice mail service in an environment having multiple voice mail technology platforms.

Thus, FIG. 2 shows the logical flow of a method used in the exemplary system 100 of FIG. 1. In the first step 140, the AMA device 112 receives call information from a communication switch 126, wherein the call information includes an identifier (e.g. the telephone number) of the subscriber to whom the call was placed. In the next step 142, the AMA device 112 queries the subscriber profile database 114 for profile information for the subscriber 124, where the profile information includes voice mail technology platform indicator information for the subscriber. In the next step 144, the AMA device 112 selects a voice mail technology platform using the voice mail technology platform indicator information obtained in the previous step 142. In the last step 146, the AMA device 112 directs the delivery of the call 122, and the identity of the subscriber to whom the call was placed, to the selected voice mail technology platform for call termination.

There are multiple delivery system architectures 132 that can be utilized by the system 100, such as a Service Control Point (SCP)-type/IN architecture or a service node architecture. In and SCP-type/IN architecture, the AMA device 112 could return a routing address for the selected voice mail technology platform to the communication switch 126, so that the call 122 could be routed directly to the selected voice mail technology platform. In the service node architecture, the AMA device 112 could serve as a pass-through switch, passing the call 122 through the AMA device 112 to the selected voice mail technology platform or to another call termination element for use with a MMSC platform, as described below.

Figure 3:
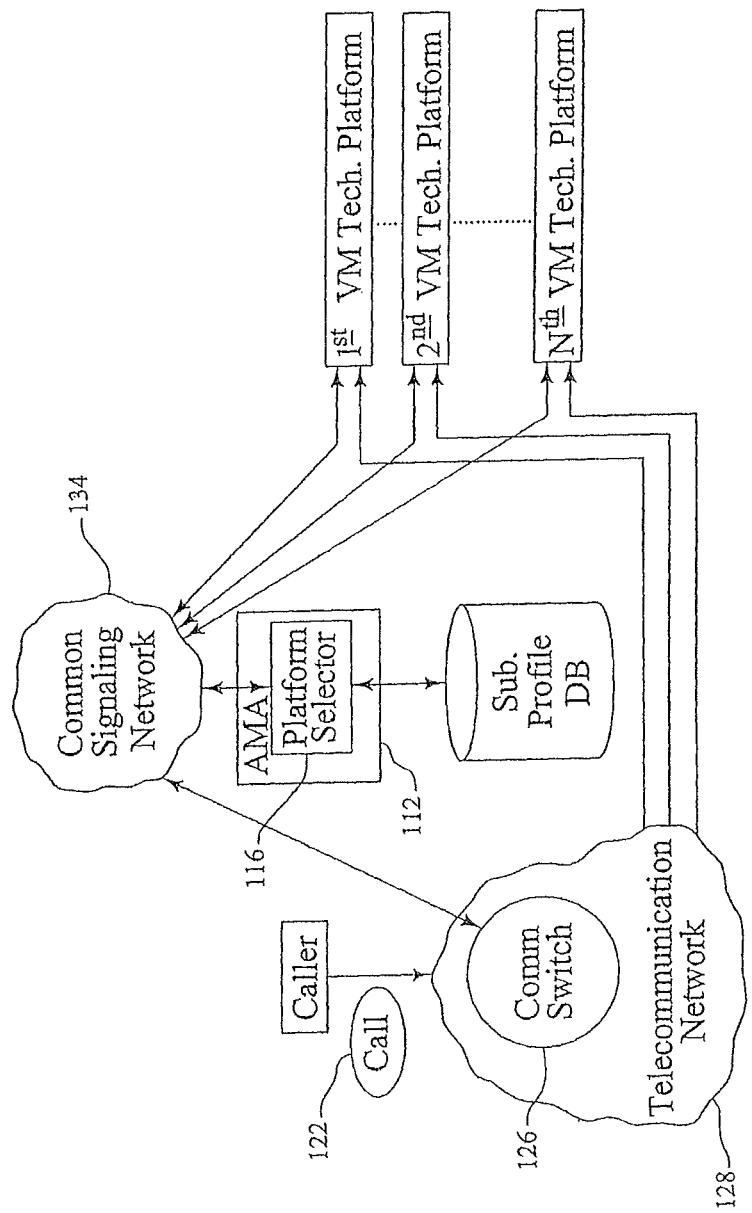
FIG. 3 is a diagram of an exemplary delivery system architecture for the system of FIG. 1.

FIG. 3 illustrates an exemplary delivery system architecture using an SCP-type/IN delivery architecture wherein the necessary signaling is accomplished through a common signaling network 134, such as an SS& network. In this example, the AMA device 112 provides the routing address for the selected voice mail technology platform to the communication switch 126 through the common signaling network 134. The call 122 can then be routed to the selected voice mail technology platform through the telecommunication network 128, which could be a PSTN or a PLMN.

Figure 4:
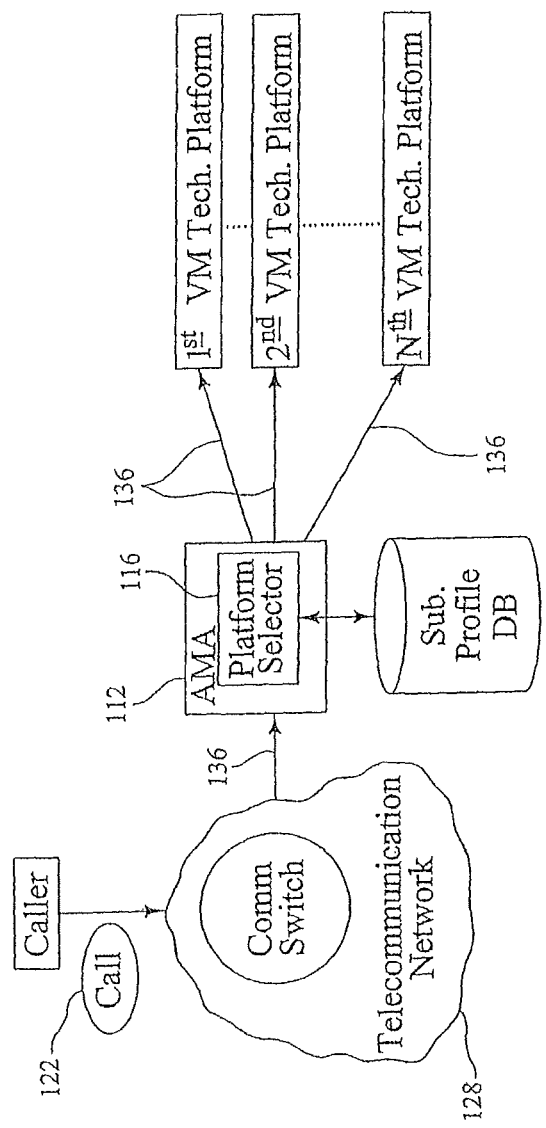
FIG. 4 is a diagram of another exemplary delivery system architecture for the system of FIG. 1.

FIG. 4 illustrates another exemplary delivery system architecture using a service node type delivery architecture wherein the AMA device 112 acts as a pass-through switch, delivery the call 122 to the selected voice mail technology platform with appropriate connections 136 through the AMA device 112. Such connections 136 could be trunk-type connections, such as MF connections, or individual lines. In this example, the necessary signaling may be accomplished as either in-band signaling or out-of-band signaling (not shown).

Figure 5:
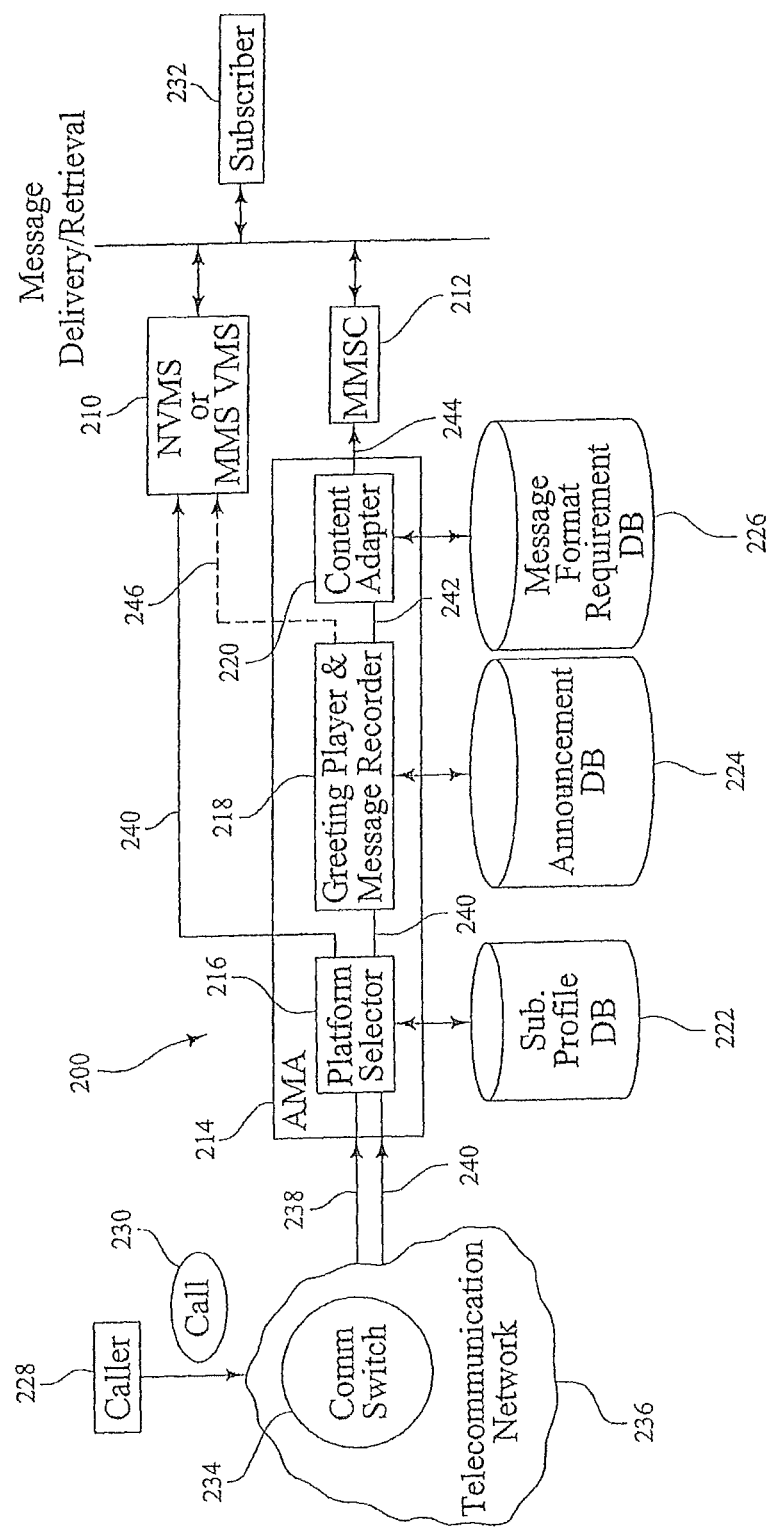
FIG. 5 is a diagram of another exemplary system for voice mail service in an environment having multiple voice mail technology platforms.

FIG. 5 shows another exemplary system 200 for providing voice mail service in an environment having multiple voice mail technology platforms 201, 212. The system 200 of FIG. 5 incorporates the elements and features of the system 100 of FIG. 1 and adds expanded functionality. In particular, the system 200 is shown with one voice mail technology platform being a NVMS or MMS VMS platform 210, and with another platform being a MMSC architecture platform 212, such as might be present in many telecommunication carrier systems.

The system 200 includes an AMA device 214. The AMA device 214 has a platform selector element 216, a greeting player and message recorder element 218, and a content adapter element 220. Additionally, the system 200 includes: a subscriber profile database 222 in communication with the platform selector element 216; an announcement database 224 in communication with the greeting player and message recorder element 218, and a message format requirement database 226 in communication with the content adapter element 220. All of the database connections are achieved through appropriate data links, such as LDAP protocol links or internal bus connections in the event of integration with their respective elements. The subscriber profile database 222 is provisioned with voice mail technology platform indicator information for subscribers. The announcement database 224 is provisioned with personal or system greeting information for subscribers. The message format requirement database 226 is provisioned with message format requirement information for subscribers, for the purpose of content adaption.

In operation, a caller 228 places a call 230 to a subscriber 232. The cal 230, or information about the call, reaches a communication switch 234 through a telecommunication network 236 for connection of the caller 228 to the subscriber 232. Upon a triggering event which indicates that the caller 228 should be connected to a voice mail system, the communication switch 234 will deliver information about the call to the AMA device 214, or, more particularly, to the platform selector element 216. The call information delivery is through an appropriate signaling means 238, such as in-band signaling over the call circuit or out-of-band signaling, such as over a common signaling network (i.e., a SS& network or the equivalent). The call information includes an identity (e.g., phone number) of the subscriber to whom the call was placed. The platform selector element 216 then obtains profile information for the subscriber 232 from the subscriber profile database 222 using the subscriber identity. The profile information includes voice mail technology platform indicator information for the subscriber 232. The platform selector element 216 then selects a voice mail technology platform by using the voice mail technology platform indicator information.

If the selected voice mail technology platform is the NVMS or MMS VMS platform 210, the call 230 and the subscriber identity can then be delivered by an appropriate delivery system architecture 240, such as described earlier, for call termination at the selected platform 210.

However, if selected voice mail technology platform is the MMSC architecture platform 212, the subscriber identity will be delivered and the caller 228 will be connected with the greeting player and message recorder element 218. The greeting player and message recorder element 218 then obtains personal or system greeting information for the subscriber 232 from the announcement database 224 using the subscriber identity. The greeting player and message recorder element 218 then plays the subscriber's personal or system greeting to the caller 228, and records a message from the caller 228. Thus, the greeting player and message recorder element 218 provides termination of the call, much like the NVMS or MMS VMS platform 201 does. Once recorded, the greeting player and message recorder element 218 can forward the message and the subscriber identity to the content adapter element 220 over an appropriate data link 242, or, directly to the MMSC architecture voice mail platform 212 (not shown).

The message may be directed to the content adapter element 220 since various MMS-capable terminals may have differing voice clip message format requirements. The content adapter element 220 may then obtain message format requirement information for the subscriber 232 (or, more accurately, the subscriber's MMS-capable terminal) from the message format requirement database 226 using the subscriber identity. The content adapter element 220 then converts the recorded voice mail message to the format indicated by the message format requirement information. Once converted, the content adapter element 220 can forward the formatted message and the subscriber identity to the MMSC 212 for the delivery to the subscriber 232 (or to the subscriber's MMS-capable terminal) over an appropriate data link 244, such as an IP protocol or an X.25 protocol link.

Another possible configured shown in FIG. 5 is moving the call termination function from the NVMS or MMS VMS platform 210 to the greeting player and message recorder element 218, and delivery the recorded message and the subscriber identity to the NVMS or MMS VMS platform 210 over an appropriate data link 246.

Additionally, it should be noted that the content adapter element 220 could be combined with the greeting player and message recorder element 218, such that the combined greeting player, message recorder and content adapter element (not shown) would deliver a properly formatted message to the selected voice mail technology platform over an appropriate data link.

Further still, the content adapter function could be moved to the selected voice mail technology platform, such that the voice mail platform would receive the recorded message from the greeting player and message recorder element 218 and perform any necessary content conversion at the voice mail platform.

Figure 6:
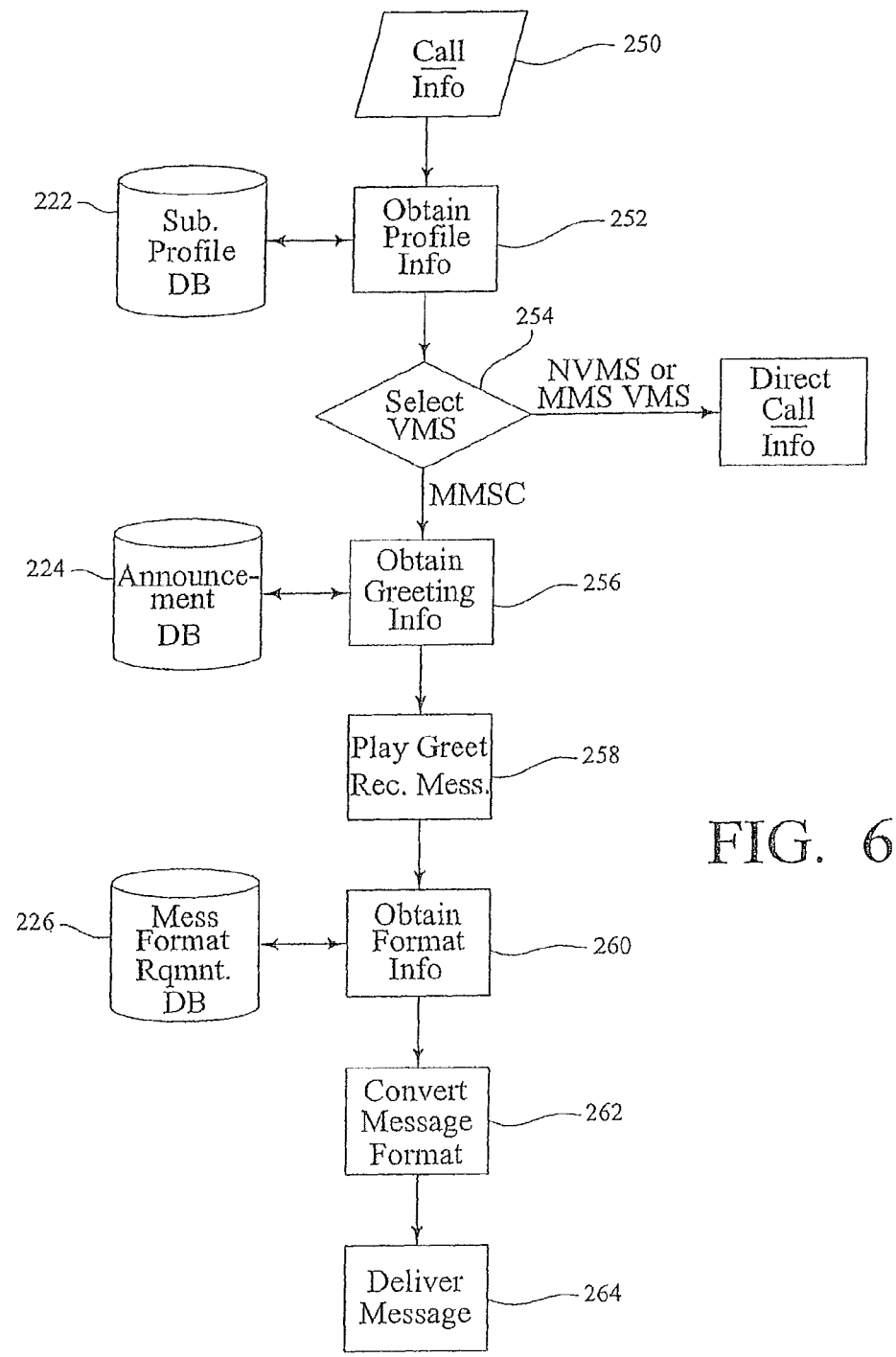
FIG. 6 is a logic flow diagram of another exemplary method for voice mail service in an environment having multiple voice mail technology platforms.

FIG. 6 shows the logical flow of a method used in the exemplary system 200 of FIG. 5. In the first step 250, the AMA device 214 receives call information from a communication switch 234, where the call information includes the identity (e.g. the telephone number) of the subscriber to whom the call was placed. In the next step 252, the AMA device 214 queries the subscriber profile database 222 for the profile information for the subscriber 232, where the profile information includes voice mail technology platform indicator information for the subscriber. In the next step 254, the AMA device 214 selects a voice mail technology platform using the voice mail technology platform indicator obtained in the previous step 252.

If the NVMS or MMS VMS platform 210 is selected, the call and the call information can then be directed to the NVMS or MMS VMS platform 210.

If the MMSC architecture platform is selected, in the following step 256, the greeting player and message recorder element 218 of the AMA device 214 queries the announcement database 224 for personal greeting information for the subscriber 232. In the next step 258, the greeting player and message recorder element 218 plays the personal greeting to the caller, and records a message for the subscriber. In the succeeding step 260, the content adapter element 220 of the AMA device 214 queries the message format requirement database 226 for message format requirement information for the subscriber 232. In the succeeding step 262, the content adapter element 220 converts the recorded voice mail message to the format indicated by the message format requirement information. In the last step 264, the AMA device 214 delivers the message to the subscriber 232 (or to the subscriber's MMS-capable terminal) through the MMSC architecture platform.

B. Enhanced Notification in an Environment Having Multiple Message Notification Technologies An environment having multiple messaging technologies also creates both opportunities and obstacles for sending message notifications. Traditionally, message notification, such as voice mail message notification, included only sending an instruction to the communication terminal to turn on and indicator on the terminal, such as a light or an icon on a display screen. However, the advanced messaging technologies, such as Short Message Service (SMS) and Multimedia Messaging Service (MMS), and advanced messaging Application Program Interfaces (APIs) supporting SMS and MMS, such as Java Messaging API, the notification message itself can be enhanced with additional information, such as the name and phone number of the party that left the message, the time that the message was deposited, and other information. This information can then be displayed on the communication terminal to provide richer message notification to the user and an improved interface.

For instance, FIG. 7 shows an exemplary communication terminal 301 having a display device 302, such as a LCD display, and an input device 303, such as a keypad. The display device 302 can be used to provide a graphical representation of a message mailbox, such as a voice mail notification inbox, where the notifications contain enhanced information such as the name 304 or number 305 that identifies the party that left each message. Additionally, an API allows adaptive presentation of the notifications, presenting notifications according to the subscriber's preferences and usage pattern rather than simply in the order that the messages were deposited.

Further, as shown in FIG. 8, the API can provide a graphical user interface (GUI) for management of the messages. Thus, by selecting a notification message as shown in the notification inbox of FIG. 7, additional information, such as the time 306 the message was deposited. Additionally, the API may allow the subscriber to initiate standard message management functions, including review, listen to, erase, store, forward, or attach note and forward. Further, communication terminals with multimedia capabilities could have options to play the calling party's name, play a short clip of a voice mail message, or download an actual voice mail message, as shown.

Figure 9:
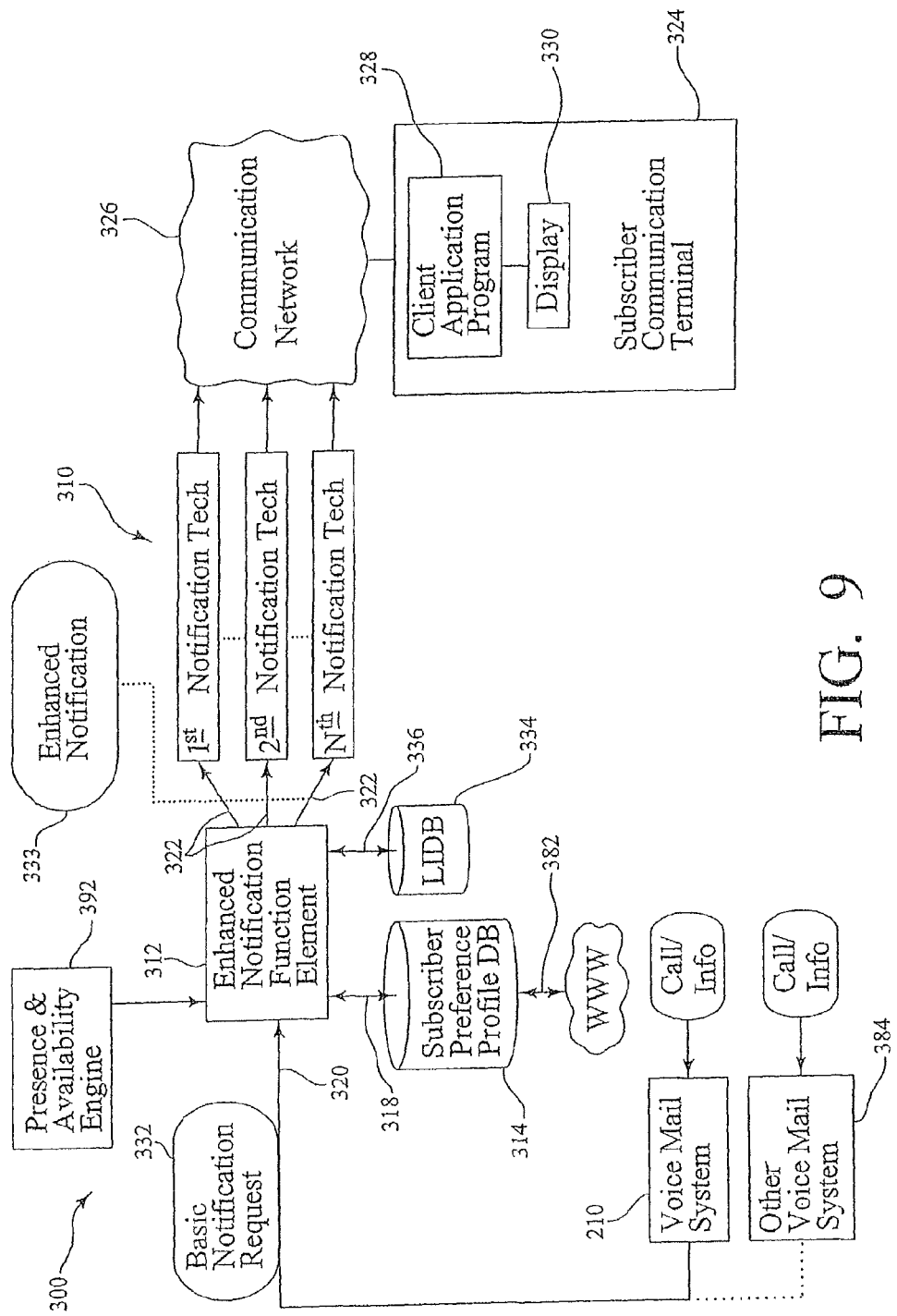
FIG. 9 is a functional block diagram of an exemplary system for providing enhanced message notification in an environment having multiple message notification technologies.

As shown in FIG. 9, an exemplary system 300 for providing enhanced message notification in an environment having multiple message notification technologies 310 includes an enhanced notification function element 312 and a subscriber preference profile database 314.

Additionally, the exemplary system 300 could also include a subscriber communication terminal 324 and a communication network 326.

The subscriber preference profile database 314 is provisioned with data relating subscriber identifier information, such as subscriber telephone numbers or other identification information, with subscriber communication terminal capabilities information. Subscriber communication terminal capabilities information includes information such as whether the terminal 324 is capable of receiving enhanced messages, such as SMS or MMS messages, whether the terminal 324 has an enhanced notification client application program 328, and any content format requirements that the terminal 324 may have.

The enhanced notification function element 312 is in communication with the subscriber preference profile database 314 through a subscriber preference profile database interface 318, such as a LDAP link or an internal bus connection in the event that the database 314 is integrated with the enhanced notification function element 312. Additionally, the enhanced notification function element 312 also has a basic notification request input 320 and enhanced notification outputs 322.

The subscriber communication terminal 324, such as a mobile phone, wireless PDA, etc., is in communication with the enhanced notification outputs 322 through the communication network 326 and the selected message notification technology 310. The communication terminal 324 has an enhanced message notification client application program 328 for receiving an enhanced notification and a display 330 for displaying the details of the notification.

In operation, the enhanced notification function element 312 receives a basic notification request 332 at the basic notification request input 320. The basic notification request 332 is a request to notify the subscriber that a new message, such as a voice mail message, has arrived at, for instance, a voice mail system (VMS) 210, as described above. The basic notification request 332 contains an identifier of the subscriber, or a subscriber identity, to whom the basic notification is directed. The identifier would most likely be an address or phone number of the subscriber's communication terminal, but could be any other data which would uniquely identify the subscriber to be notified. Additionally, the basic notification request 332 arrives via appropriate signaling means, such as SS7 or IF.

The enhanced notification function element 312 then queries the subscriber preference profile database 314 to obtain subscriber communication terminal capabilities information using the subscriber identifier. The enhanced notification function element 312 can then determine, among other things, if the subscriber terminal 324 has: 1) enhanced messaging capabilities; and 2) an enhanced message notification client application program 328.

The enhanced notification function element 312 then selects a notification technology 310 for delivery of an enhanced notification message 333 to the subscriber terminal 324. The enhanced notification function element 312 uses the subscriber communication terminal capabilities information as the criteria for making the selection. Primary considerations in selecting a message notification technology are whether the subscriber communication terminal has the capability to receive enhanced messages, such as SMS or MMS messages, and also has an enhanced notification client application program. Thus, if the subscriber terminal does not have capabilities for receiving enhanced messages, or does not have an enhanced notification client application program, the message notification will need to be delivered as a traditional message notification message. However, if the subscriber terminal does have capabilities for receiving enhanced messages, and also has an enhanced notification client application program, an enhanced notification technology may be selected.

The enhanced notification function element 312 can then format, or assemble, an enhanced notification 333 with enhanced information. Examples of enhanced information include an identifier of the party leaving the message, and the date/time that the message was left 210. This information can be used by the subscriber to determine the importance of the message. Alternatively, the enhanced notification client application program may be programmed to adaptively present message notifications based on subscriber preferences or usage patterns. Further, the enhanced notification function element 312 can determine from the terminal capabilities information if any content adaptation is required in order for the terminal 324 to properly receive the enhanced notification 333, and perform the necessary content adaptation to the enhanced notification.

Figure 10:
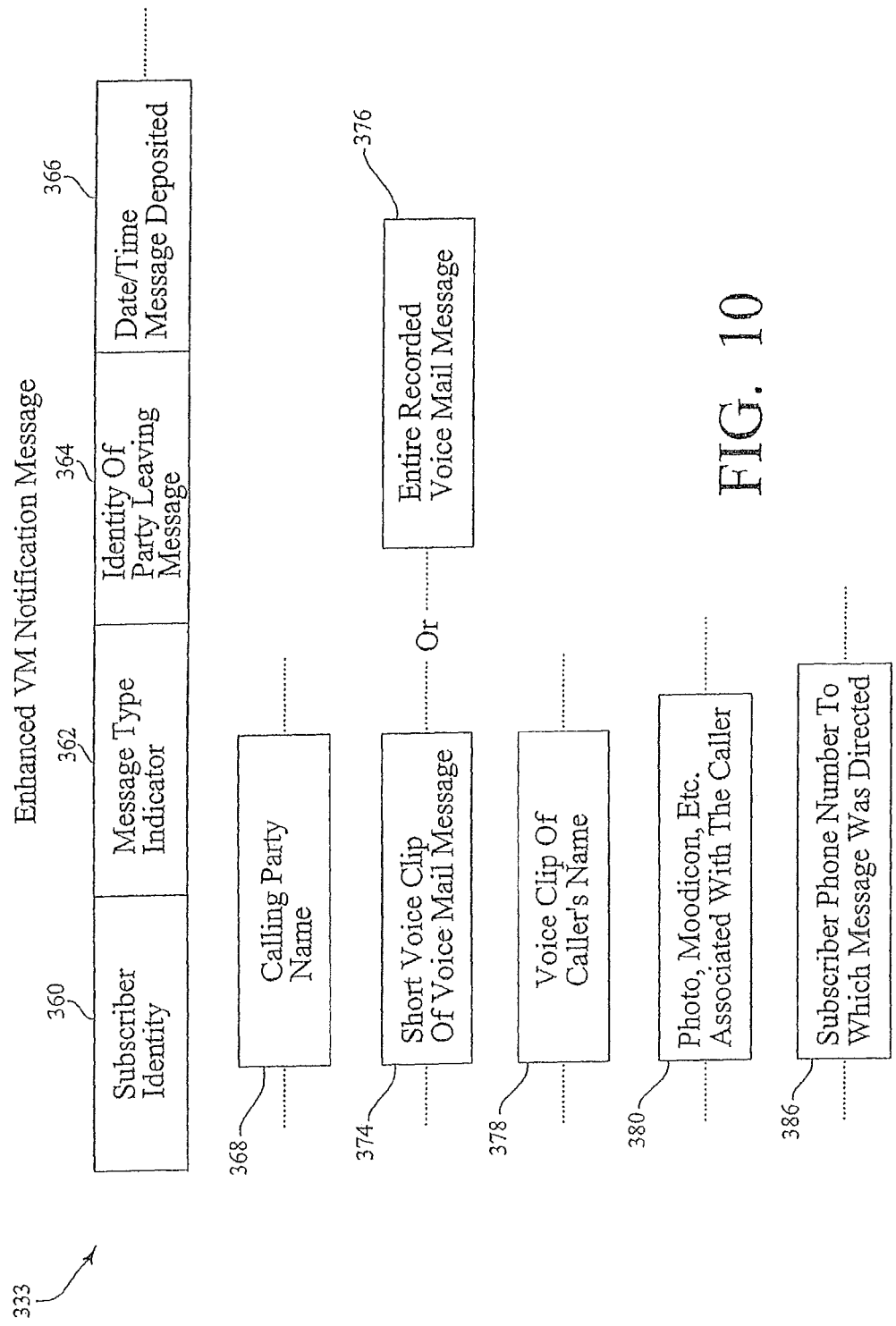
FIG. 10 is a diagram of an enhanced message notification.

Thus, FIG. 10 shows an exemplary enhanced voice mail notification message 333 containing, in addition to the subscriber identifier 360, a message type indication 362, the identifier of the party leaving the message 364, and the date/time that the message was left 366.

The message type indicator 362 is used to indicate to the subscriber terminal 324 that the notification 333 is enhanced, and should be forwarded to the enhanced notification client application program 328 for processing. Further, the message type indicator 362 will indicate the actual message type, such as voice mail, e-mail, fax or multimedia, in an environment having multiple message types. Thus, the client application program 328 can provide a distinctive audio alert or icon for each message type, in addition to providing the graphical representation of a message mailbox, as described earlier.

Returning to FIG. 9, the system 300 may also include a Line Information Data Base (LIDB) 334 provisioned with data relating calling party phone numbers with calling party names. The enhanced notification function element 312 is in communication with the LIDB 334 through a LIDB interface 336, which could be a SS7 or IP communication link. Thus, in an environment where messages are deposited by telephone, such as with voice mail and fax, the identifier of the party leaving the message will be the calling party phone number. The enhanced notification function element 312 can then obtain the calling party name from the LIDB 334 using the calling party phone number. The enhanced notification message 333 can then be enhanced further with the calling party name 368, as shown in FIG. 10.

Figure 11:
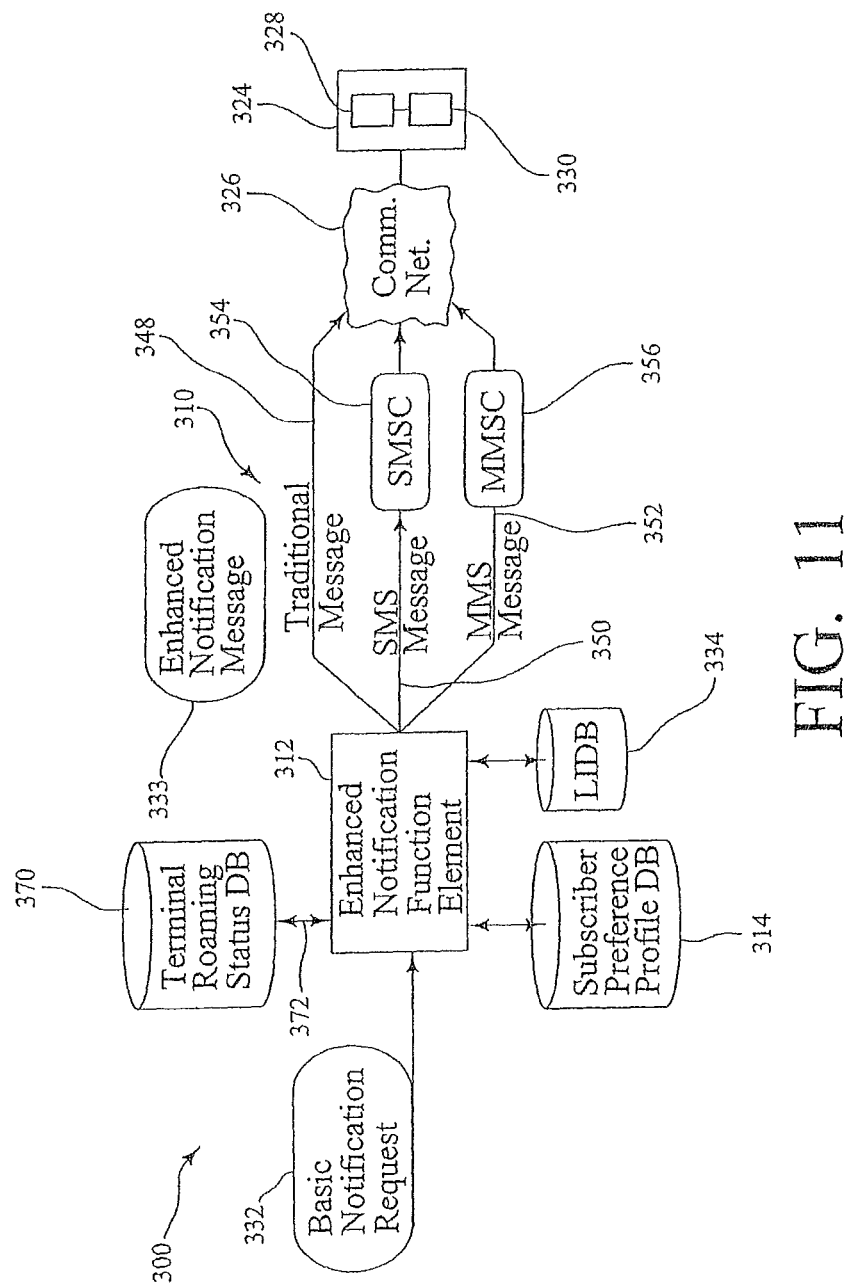
FIG. 11 is a functional block diagram of an exemplary system for providing enhanced message notification, showing several exemplary message notification delivery system architectures.

The delivery of the enhanced notification 333 may be accomplished through a delivery system architecture appropriate for the selected message notification technology 310. As shown in FIG. 11, exemplary delivery system architectures include: traditional message notification, SMS based message notification, or MMS based message notification. Thus, shown are a Short Message Service Center (SMSC) 354 as a part of the delivery system architecture for SMS enhanced message notification technology, and a Multimedia Messaging Service Center (MMSC) 356 as a part of the delivery system architecture for MMS enhanced message notification technology.

C. Enhanced Message Notification

Wireless Roaming Issues

The subscriber communication terminal 324 could be a wireless terminal, in which case the communication network 326 could be a Public Land Mobile Network (PLMN). When the terminal 324 is a wireless terminal, roaming charges may apply to delivery of enhanced notifications. If roaming charges apply, the subscriber's home service provider may have rules for determining how the enhanced notification and the content of such a notification should be sent, in order to reduce adverse charges to the subscriber.

The system 300 may have a terminal roaming status database 370 that relates subscriber identifier information with terminal roaming status information, such as an identification of the communication switch that is currently serving the terminal 324. The enhanced notification function element 312 may then be in communication with the terminal roaming status database 370 through a terminal roaming status database interface 372. Typically, the roaming status information is contained in a Home Location Register (HLR) which the enhanced notification function element 312 can access through a SS7 Signaling Network. By accessing the roaming status database 370, the enhanced notification function element 312 can determine if the terminal 324 is roaming. If the enhanced notification function element 312 determines that the terminal 324 is roaming, the enhanced notification function element 312 may apply the home service provider's rules to determine if and how the enhanced notification should be sent.

D. Enhanced Message Notification

Integration with Automatic Message Attendant (AMA) Device

Figure 12:
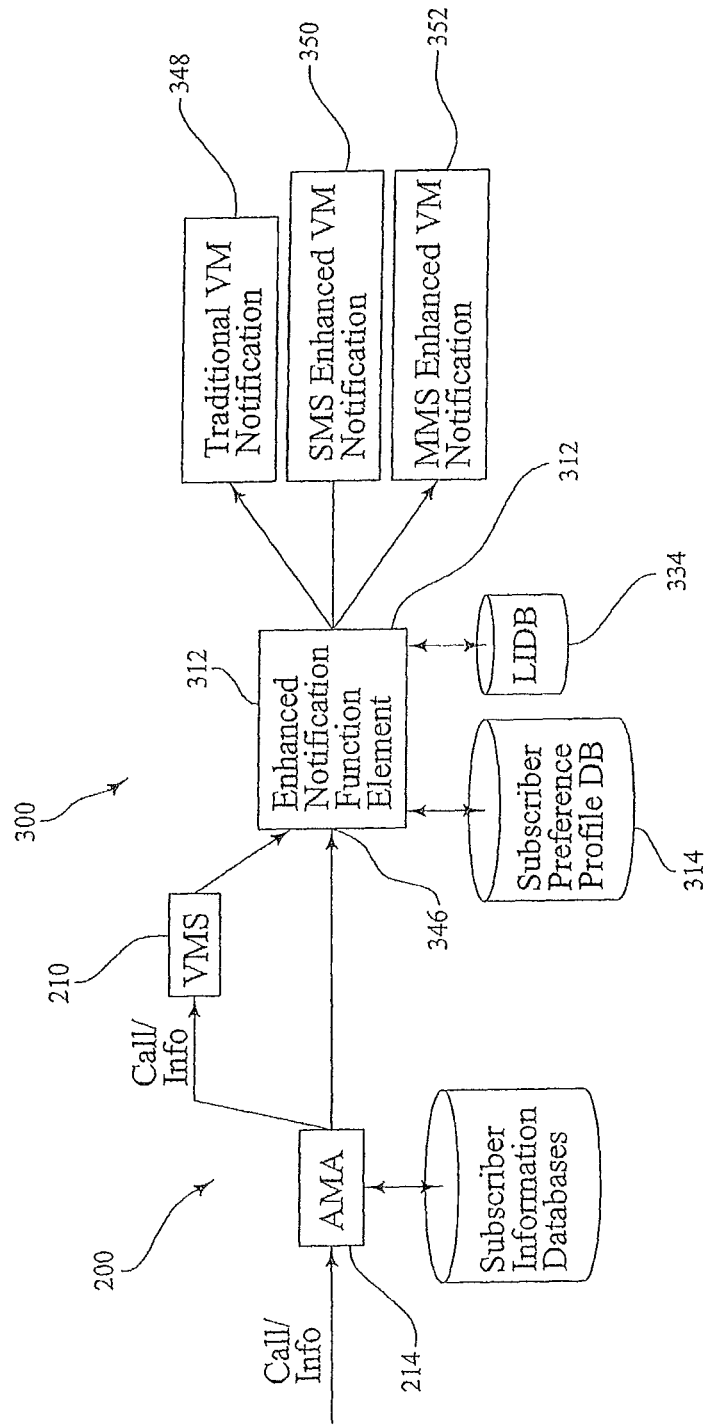
FIG. 12 is a functional block diagram of an exemplary system for providing enhanced message notification in an environment having multiple messaging technologies, including integration of the system with an Automatic Message Attendant (AMA) device.

Advantageously, as shown in FIG. 12, the system 300 described can be integrated with the system 200 for providing voice mail service in an environment having multiple voice mail technology platforms described above. Thus, an Automatic Message Attendant (AMA) device 214 may serve to receive a call and select a voice mail technology platform. If a voicemail system (VMS) platform 210 is selected, the call and call information can be directed to the VMS platform 210, which will record a message and generate a basic message notification request 333. The basic notification request 332 will then be received by the enhanced notification function element 312 at the basic notification request input 320. The enhanced notification function element 312 can then format an enhanced notification 333 and perform any necessary content adaptation, as described above. The notification 333 can then be delivered, for example, using a traditional message notification technology 348, a SMS enhanced message notification technology 350, or a MMS enhanced message notification technology 352, as appropriate.

However, the enhanced notification function element 312 may also have an AMA message input 346 for receiving a recorded voice mail message directly from the AMA device 214, as described above. Thus, returning to FIG. 10, the enhanced notification function element 312 may even further enhance the notification 333 with a short audio clip (or voice clip) of the voice mail message 374, or a file containing the entire recorded voice mail message 376, if the terminal 324 is capable of receiving such messages.

E. Enhanced Message Notification

Association of Objects with Party Leaving Message

Additionally, the enhanced notification function element 312 may still further enhance the voice mail notification message 333 with an audio clip of the caller's name 378, and a photo, mood icon 388 (or moodicon), presence and availability indicator 390, or any other multimedia object 380 that the subscriber might choose to associate with the identifier of the party leaving the message 364 in the subscriber preference profile database 314.

For presence and availability information, a presence and availability engine 392, such as shown in FIG. 9, and related procedures would be used to obtain the presence and availability status of the calling party (such as defined in 3GPP IS 22.141 and 3GPP US 23.141). As the presence and availability of the calling party changes, the enhanced notification function element 312 can update the notification message to reflect current status information on the subscriber's terminal display.

Returning now to FIG. 9, a web interface 382 may be provided so that the subscriber can associate objects with the identifier of the party leaving the message.

F. Enhanced Message Notification

Other Voice Mail Systems

Additionally, as shown in FIG. 9, the enhanced notification function element 312 could receive basic notification requests from other message systems 384 where a subscriber might receive messages, such as work, home and mobile phones. In this case, the enhanced notification function element 312 might also enhance the notification 333 with information regarding the subscriber phone number to which the message was directed.

A representation of the enhanced notification 333 having information regarding the subscriber phone number to which the message was directed 386 is shown in FIG. 10.

G. Method of Enhanced Message Notification

Figure 13:
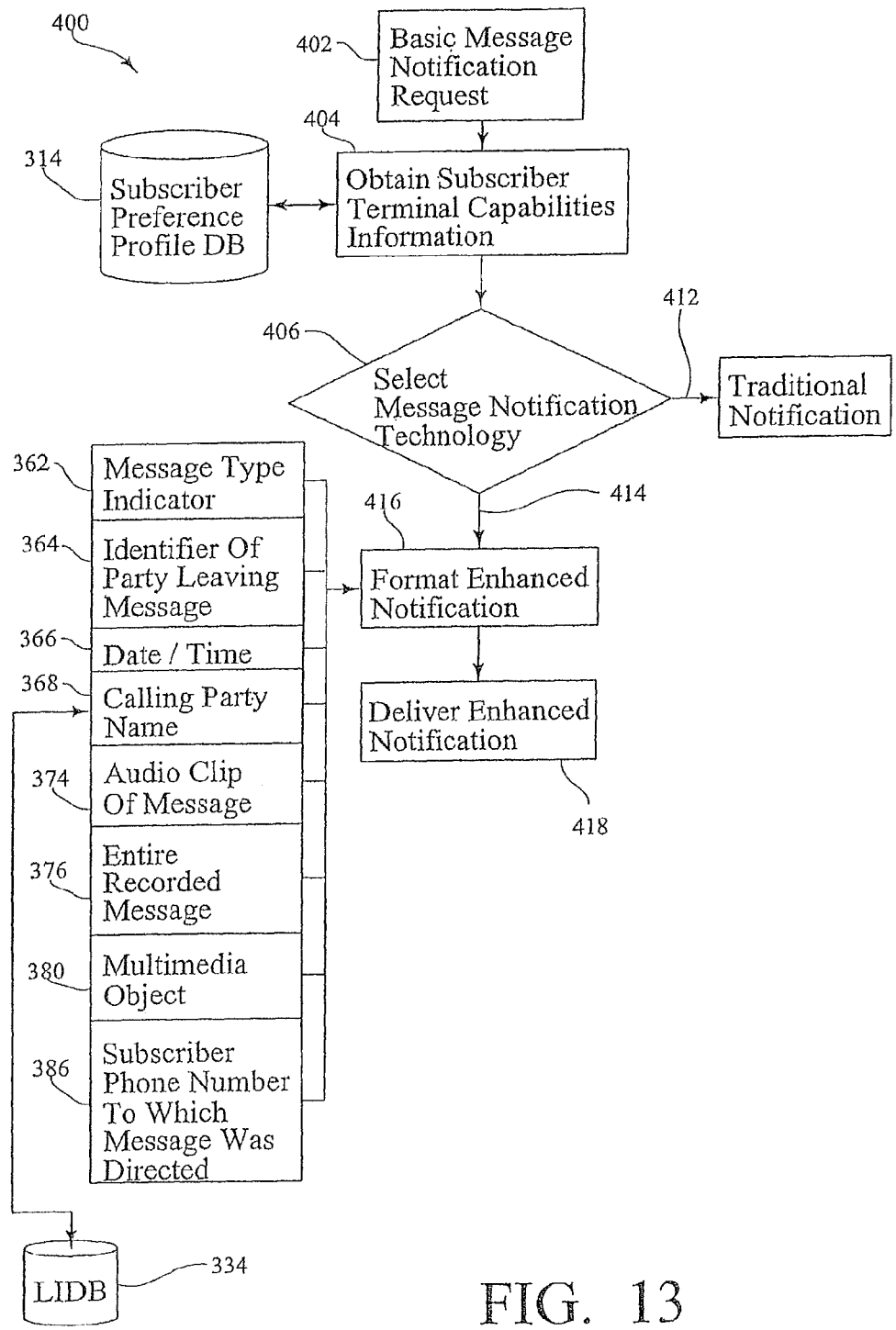
FIG. 13 is a flow diagram for a method of enhanced message notification.

Thus, as shown in FIG. 13, an exemplary method 400 for enhanced message notification includes the steps of: 402 receiving a basic message notification request; 404 obtaining subscriber terminal capabilities information (from a subscriber preference profile database 314); and 406 selecting a message notification technology for delivery of an enhanced notification.

Figure 14:
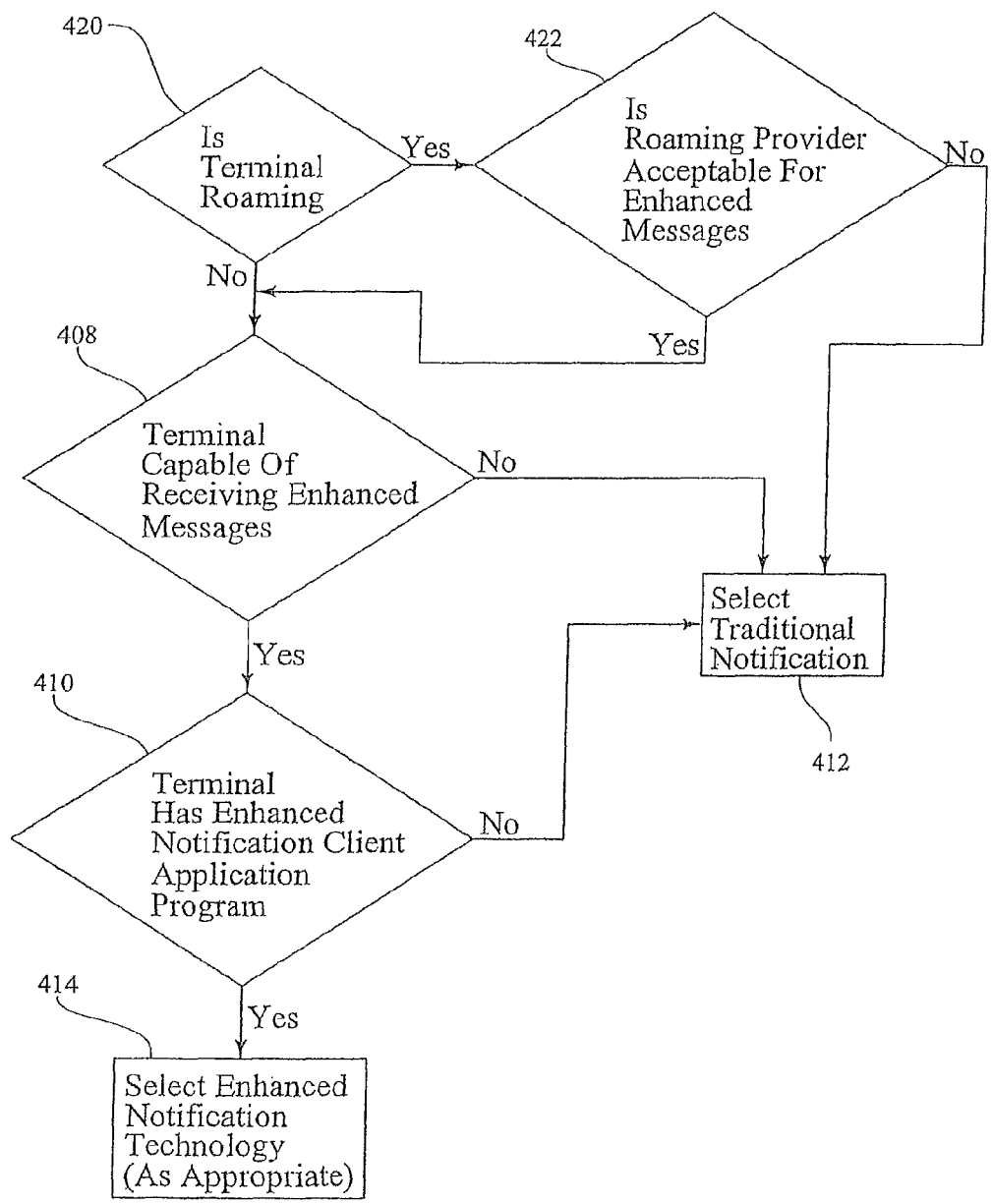
FIG. 14 is a flow diagram showing the step of selecting a message notification technology of FIG. 13 in greater detail.

As further shown in FIG. 14, the step of 406 selecting a message notification technology may include the steps of: 408 determining if the subscriber terminal is capable of receiving enhanced messages; and 410 determining if the terminal has an enhanced notification client application program. If the terminal is not capable of receiving enhanced messages or does not have an enhanced notification client application program, then the next step 412 is to select a traditional notification technology. However, if the terminal is capable of receiving enhanced message and has an enhanced notification client application program, then the next step 414 is to select an enhanced notification technology. If more than one enhanced notification technologies are available, such as SMS or MMS, this step 414 may include selecting the most appropriate enhanced notification technology.

Returning to FIG. 13, if an enhanced notification technology is selected 414, the exemplary method 400 for enhanced message notification may also include the steps of: 416 formatting an enhanced notification; and 418 delivering the enhanced notification to the terminal using the selected message notification technology. The enhanced notification may include information such as: a message type indication 362, an identifier of the party leaving the message 364; the date and time that the message was deposited 366; the calling party name 368 (obtained from a LIDB 334, as described above); an audio clip of a portion of a recorded voice message 374 or an entire recorded message 376; a multimedia object 380, such as an audio clip or the name of the party leaving the message, or a photograph or mood icon associated with the party leaving the message; or a subscriber phone number to which the message was directed 386, in the event that notification requests may be coming from multiple messaging systems.

Lastly, as shown in FIG. 14, if the terminal is a wireless terminal, a preliminary step in selecting a message notification technology may be to 420 determine if the terminal is roaming. If the terminal is not roaming, the selection of a message notification technology may proceed as described earlier. However, if the terminal is roaming, the next step could be to 422 determine if the roaming service provider is an acceptable partner, for cost or other reasons, for delivering enhanced messages. If the roaming service provider is an acceptable partner, the selection of a message notification technology may proceed as described earlier. However, if the roaming service provider is not an acceptable partner, traditional notification would be selected 412.

H. Conclusion

In the above description of the present invention, it should be recognized that the system, including the described elements thereof, and the various database elements may be implemented on digital computing equipment, or the equivalent, through the use of computer programs, or the equivalent. Thus, the method of the invention may be found as executable instructions contained on a computer readable medium.

Thus, the invention provides a system and method for providing enhanced message notification in an environment having multiple notification technologies. One of ordinary skill in the art will recognize that additional configurations are possible without departing from the teachings of the invention or the scope of the claims which follow. This detailed description, and particularly the specific details of the exemplary embodiments disclosed, is given primarily for clearness of understanding and no unnecessary limitations are to be understood therefrom, for modifications will become obvious to those skilled in the art upon reading the disclosure and may be made without departing from the sprit or scope of the claimed invention. With regard to the claims, no claim is intended to invoke the sixth paragraph of 35 U.S.C. Section 112 unless it includes the term "means for" followed by a participle.

The invention claimed is:

1. A system, comprising:
    a processor; and
    a computer-readable medium comprising computer-executable instructions that, when executed by the processor, cause the processor to perform operations comprising:
        receiving a voice mail message including an identifier corresponding to a mobile device;
        obtaining, using the identifier, and in response to receiving the voice mail message, mobile device capability information; and
        determining whether the mobile device capability information indicates that the mobile device has an enhanced voice mail notification program.

2. The system of claim 1, wherein the operations further comprise:
    selecting, based on the mobile device capability information, a voice mail notification technology for use in delivering an enhanced voice mail notification to the mobile device;
    formatting, based on the voice mail message, and in response to determining that the mobile device capability information indicates that the mobile device does not have an enhanced voice mail notification program, a traditional voice mail notification, yielding a formatted voice mail notification; and
    formatting, based on the voice mail message, and in response to determining that the mobile device capability information indicates that the mobile device has an enhanced voice mail notification program, the enhanced voice mail notification, yielding a formatted voice mail notification.

3. The system of claim 2, wherein the operation of formatting the enhanced voice mail notification comprises formatting the enhanced voice mail notification to have a message type indicator indicating that the enhanced voice mail notification is an enhanced notification and should be processed by the enhanced voice mail notification program.

4. The system of claim 2, wherein the operations further comprise:
    identifying a roaming service provider if the mobile device is roaming; and
    determining whether the roaming service provider is capable of delivering enhanced voice mail notifications; wherein:
        the operation of selecting the enhanced voice mail notification technology is performed based on the mobile device capabilities and whether the roaming service provider is capable of delivering enhanced voice mail notifications;
        the operation of formatting the traditional voice mail notification is performed in response to determining that the mobile device capability information indicates that the mobile device does not have an enhanced voice mail notification program or that the roaming service provider is not capable of delivering enhanced voice mail notifications; and
        the operation of formatting the enhanced voice mail notification is performed in response to determining that the mobile device capability information indicates that the mobile device has an enhanced voice mail notification program and that the roaming service provider is capable of delivering enhanced voice mail notifications.

5. The system of claim 4, wherein the operation of determining whether the roaming service provider is capable of delivering enhanced voice mail notifications, comprises accessing a database relating mobile device identifiers with roaming statuses of corresponding mobile devices.

6. The system of claim 2, wherein the operation of formatting the enhanced voice mail notification, comprises formatting the enhanced voice mail notification to have a multimedia object associated with a party leaving the voice mail message.

7. The system of claim 6, wherein the operation of formatting the enhanced voice mail notification to have the multimedia object comprises formatting the enhanced voice mail notification to have the multimedia object including at least one object type selected from a group of object types consisting of:
    an audio clip identifying a name of the party;
    a picture identifying the party;
    a presence indicator associated with the party; and
    an availability indicator associated with the party.

8. The system of claim 1, wherein the operations further comprise determining whether the mobile device capability information indicates that the mobile device is capable of receiving enhanced voice mail notifications.

9. The system of claim 8, wherein the operations further comprise:
    selecting, based on the mobile device capability information, a voice mail notification technology for use in delivering an enhanced voice mail notification to the mobile device;
    formatting, in response to determining that the mobile device capability information indicates that the mobile device is not capable of receiving enhanced voice mail notifications or that the mobile device does not have an enhanced voice mail notification program, a traditional voice mail notification corresponding to the voice mail message; and
    formatting, in response to determining that the mobile device capability information indicates that the mobile device is capable of receiving enhanced voice mail notifications and that the mobile device has an enhanced voice mail notification program, the enhanced voice mail notification, corresponding to the voice mail message.

10. The system of claim 1, further comprising:
    a database relating mobile device identifiers with capability information of corresponding mobile devices, the capability information indicating whether the mobile devices are capable of receiving enhanced voice mail notifications and whether the mobile devices have an enhanced voice mail notification program;

wherein the operation of obtaining mobile device capability information using the identifier, comprises accessing the database.

11. A system, comprising:

a processor; and a computer-readable medium comprising computer-executable instructions that, when executed by the processor, cause the processor to perform operations comprising:

receiving a voice mail message including an identifier corresponding to a mobile device;

obtaining mobile device capability information using the identifier;

determining whether the mobile device capability information indicates that the mobile device is capable of receiving enhanced voice mail notifications;

selecting, based on the mobile device capability information, a voice mail notification technology for delivery of an enhanced voice mail notification; and formatting, in response to determining that the mobile device capability information indicates that the mobile device is capable of receiving enhanced voice mail notifications, the enhanced voice mail notification corresponding to the voice mail message, yielding a formatted voice mail notification.

12. The system of claim 11, wherein the operations further comprise:

formatting, in response to determining that the mobile device capability information indicates that the mobile device is not capable of receiving enhanced voice mail notifications, a traditional voice mail notification corresponding to the voice mail message, yielding a formatted voice mail notification.

13. The system of claim 12, wherein the operations further comprise:

identifying a roaming service provider if the mobile device is roaming; and determining whether if the roaming service provider is capable of delivering enhanced voice mail notifications;

wherein:

the operation of selecting the enhanced voice mail notification technology is performed based on the mobile device capabilities and whether the roaming service provider is capable of delivering enhanced voice mail notifications;

the operation of formatting the traditional voice mail notification is performed in response to determining that the mobile device capability information indicates that the mobile device is not capable of receiving enhanced voice mail notifications or that the roaming service provider is not capable of delivering enhanced voice mail notifications; and the operation of formatting the enhanced voice mail notification is performed in response to determining that the mobile device capability information indicates that the mobile device is capable of receiving enhanced voice mail notifications and that the roaming service provider is capable of delivering enhanced voice mail notifications.

14. The system of claim 12, wherein the operation of formatting the enhanced voice mail notification comprises formatting the enhanced voice mail notification to have a message type indicator indicating that the notification is an enhanced notification and should be processed by an enhanced voice mail notification program.

15. A system, comprising:

a processor; and a computer-readable medium comprising computer-executable instructions that, when executed by the processor, cause the processor to perform operations comprising:

receiving a voice mail message including an identifier corresponding to a mobile device;

identifying, in response to having received the voice mail message, and if the mobile device is roaming, an applicable roaming service provider; and determining whether the roaming service provider identified is capable of delivering enhanced voice mail notifications.

16. The system of claim 15, wherein the operations further comprise:

selecting an enhanced voice mail notification technology based on whether the roaming service provider is capable of delivering enhanced voice mail notifications;

formatting, in response to determining that the roaming service provider is not capable of delivering enhanced voice mail notifications, a traditional voice mail notification, yielding a formatted voice mail notification; and formatting, in response to determining that the roaming service provider is capable of delivering enhanced voice mail notifications, an enhanced voice mail notification, yielding a formatted voice mail notification.

17. The system of claim 16, wherein the operation of formatting the enhanced voice mail notification, comprises formatting the enhanced voice mail notification to have a message type indicator indicating that the notification is an enhanced notification and should be processed by an enhanced voice mail notification program.

18. The system of claim 16, wherein the operations further comprise initiating transmission of the formatted voice mail notification to the mobile device.

19. The system of claim 12, wherein the operations further comprise initiating transmission of the formatted voice mail notification to the mobile device.

20. The system of claim 2, wherein the operations further comprise initiating transmission of the formatted voice mail notification to the mobile device.

* * * * *